Feb. 7, 1956  G. A. OSTERMEYER  2,733,542
TRAP DEVICE FOR RODENTS AND THE LIKE
Filed Jan. 26, 1954  2 Sheets-Sheet 1
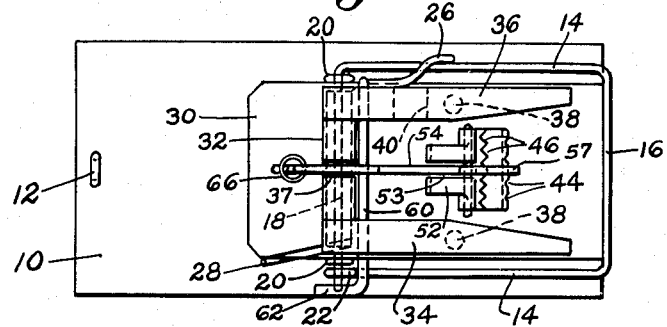
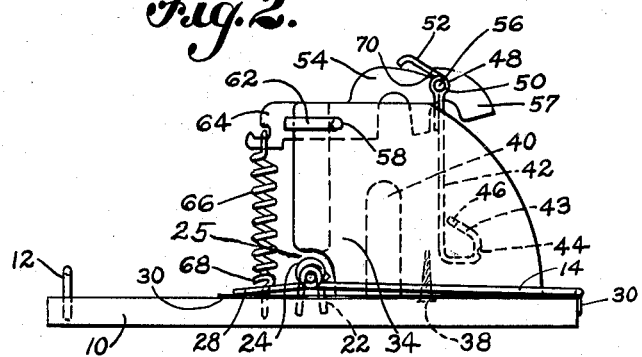
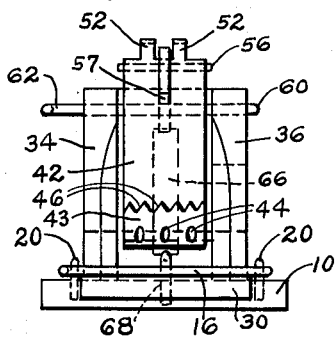
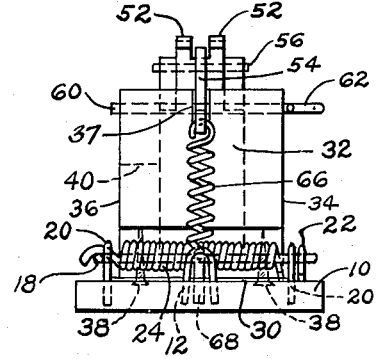
INVENTOR.
Gustavus A. Ostermeyer
BY Harold E. Cole
Attorney

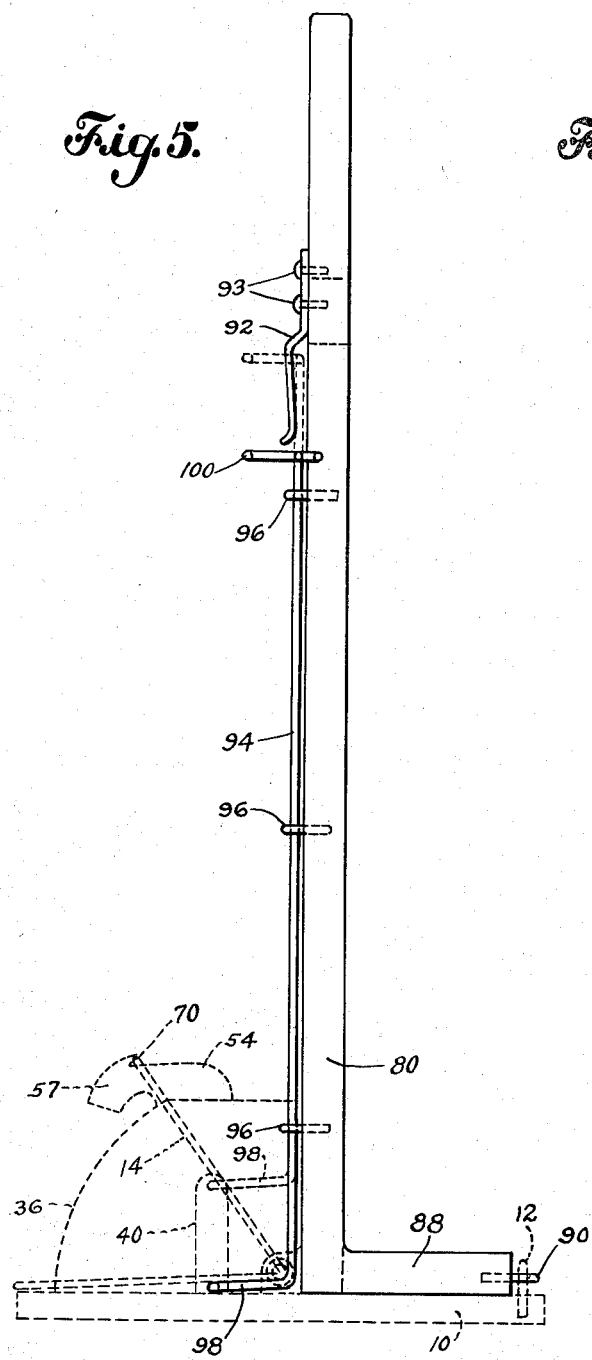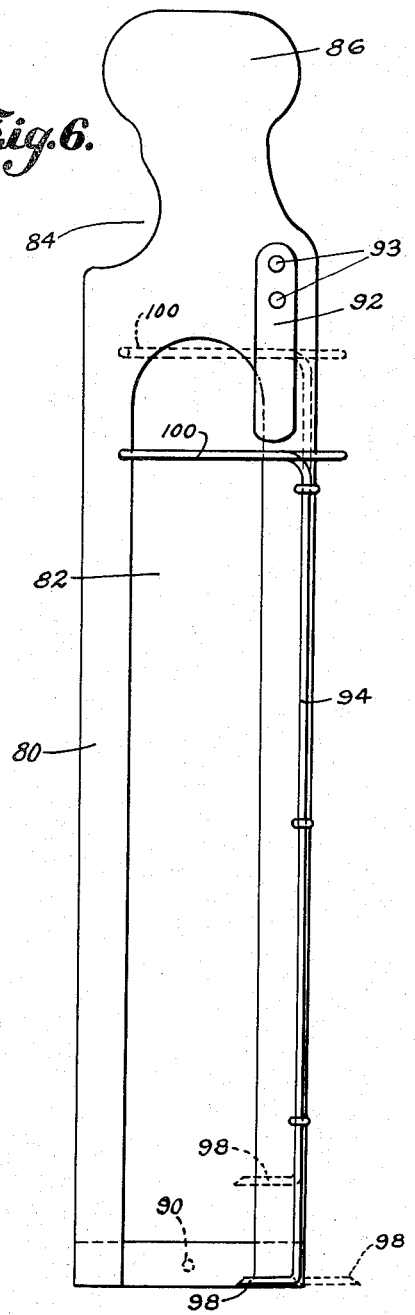

United States Patent Office 2,733,542
Patented Feb. 7, 1956

2,733,542
TRAP DEVICE FOR RODENTS AND THE LIKE
Gustavus A. Ostermeyer, Boston, Mass.
Application January 26, 1954, Serial No. 406,106
5 Claims. (Cl. 43—83.5)

This invention relates to trap devices for rodents and the like.

One object of my invention is to provide a trap to catch rodents and the like provided with a bait holder and stall so that a rodent can reach the bait only from the front of the trap. Thus the rodent is caught at the neck or adjacent thereto, and is very likely to be killed outright by the spring actuated clamp.

Another object is to provide such a trap device having mechanism to permit a separate control member to open or release the spring actuated clamp, and thus disengage the rodent therefrom without making personal contact with the animal.

A further object is to provide such a trap device having mechanism whereby said separate control member can set the trap in open position and the bait inserted in the bait holder, while the spring actuated clamp is safely retained in open position.

A still further object is to provide such a trap device and control member that are simple in operation, economical to manufacture, and the correct use of which can readily be learned by an ordinary person.

The foregoing and other objects which will appear as the nature of the invention is better understood, may be accomplished by a construction, combination and operative arrangement of parts such as is disclosed by the drawings. The nature of the invention is such as to render it susceptible to various changes and modifications, and therefore, I am not to be limited to the construction disclosed by the drawings nor to the particular parts described in the specification; but am entitled to all such changes therefrom as fall within the scope of my claims.

In the drawings:

Figure 1 is a top plan view of my trap in closed position.

Figure 2 is a side elevational view thereof.

Figure 3 is a front elevational view thereof.

Figure 4 is a rear elevational view thereof.

Figure 5 is a side elevational view of the control member for my trap, showing it connected to my trap device that appears in dash lines in set position.

Figure 6 is a front elevational view of said control member.

As illustrated, my trap device has a base 10 which ordinarily is made of a flat piece of wood. At one end portion a staple or retainer 12 is mounted which is used to retain a control member, later described, when the latter is used. Said trap has a spring actuated jaw in common use, having two sides 14, a cross bar 16 at the front and a shaft 18 at the rear, the latter loosely extending through two staples 20 set in said base at opposite side portions thereof. A loop portion 22 at one end of one of said side portions 14, which said shaft 18 extends through, retains said spring actuated jaw in place. A coil spring 24 is positioned in the space 25 provided by undercut portions of a stall back and sides later described. This spring 24 is loosely mounted on said shaft 18, one end 26 of which lies across one of said jaw side shaft 18 and bears on said base 10. Thus said spring 24 tends to force down and keep the spring actuated jaw in closed position in the usual way.

Said base 10 is preferably reinforced by a metal plate 30 lying on and partly covering it. On said plate is a stall or mounting member having a back 32 directly above said coil spring 24 and two arcuate sides 34 and 36 extending forwardly of said back with said spring actuated jaw outside of and spaced therefrom. Said portions 14, and the other end 28 extends under said back has a slot 37 therein extending downwardly from the top. This stall is held to said metal plate 30 by screws 38 under it which extend upwardly into the sides 34 and 36 thereof. A slot 40 extends from the bottom upwardly in said side 36.

A bait holder has a main body 42 terminating in a reverse lower end 43 providing a receiver portion for the bait with holes 44 therein and teeth 46 at the end extremity thereof. At the upper end said bait holder has two turned-over extensions 48 at opposite sides which are formed to provide bearing openings 50 extending laterally. Between said extensions 48 is an actuator portion shown as a forked guide portion 52 curving rearwardly and having a slot 53 therein. Said portion 52 may be curved forwardly and upwardly to serve as a stop member to keep said spring actuated jaw from being pulled too far rearwardly of a tooth 70.

A supporting catch 54 for said bait holder has a shaft 56 extending therethrough and through said bearing openings 50 thus pivotally holding said bait holder to said support. The forward part of said supporting catch 54 serves as a stop portion 57 limiting the forward swinging movement of said bait holder. There is another hole 58 in said catch 54 rearwardly of the bait holder and a shaft 60 removably extends through said stall sides 34 and 36 and said latter hole 58, terminating in a hooked, retaining end 62.

Thus said supporting catch 54 carrying said bait holder, is pivotally mounted on said stall. Its rear or tail portion 64 extends through said slot 37 in the stall back 32 and the catch is held under tension by a vertical coil or counter spring 66 attached at one end to the rear portion 64 and at the other end to a hook 68 fixed in said base 10. Said catch 54 has an indent or tooth 70 formed in it where said forked guide slot 53 commences, which tooth normally projects slightly above said forked guide 52 so that said spring actuated jaw cross bar 16 may be caught and held at its rear so said jaw can be held in open or set position.

When said spring actuated jaw is moving to set position, it forces the curved, front part of the catch 54 slightly downward, then releases the latter to normal position by the time the rear of said tooth 70 contacts said cross bar 16. At this point said jaw cross bar 16 projects above the adjacent part of said forked portion 52. As the animal nibbles at the bait he forces said bait holder to swing rearwardly, since the latter is freely suspended on said supporting catch 54. This rearward swinging movement of the bait holder causes said forked portion 52 to move forward pushing said jaw cross bar 16 over said tooth 70, thus releasing it to catch the animal in the usual way. Movement of said bait holder rearwardly also tends to force said supporting catch 54 slightly downward.

When it is desired to open said spring actuated jaw, as for instance, to release the body of a rodent caught in the trap, I provide a control member, shown in Figures 5 and 6 of the drawings, which can be used in combination with my trap to open the latter, and to reset the spring actuated jaw to open position, and also to retain said spring actuated jaw against any movement while baiting the bait holder.

This control member has a main body 80 in which an elongate slot 82 is provided extending from the bottom to a point spaced from the top. A finger recess 84, above said slot, is provided in the handle portion 86. At the lower end an extension base 88 is attached to said main body 80 and is forward of said body 80 and in which is fixed a retainer, shown as a pin 90, which projects beyond said extension bottom and is adapted to enter the opening in said retaining staple 12.

Attached to and lying next to said body 80 is a spring retainer 92, held by pins 93, the lower part of which is spaced from the body. A control rod 94 is slidably mounted on said body 80, being movably retained by screw eyes 96 fixed in said body. This rod 94 has an angular lifting finger 98 which projects inwardly, in position of use, towards said slot 40 in the trap stall side 36. A laterally extending handle 100 at the upper end of the rod 94 extends across said slot 82 being turned back upon itself. All parts of this control rod 94 are shown formed of a single piece of wire.

When the trap has caught an animal, the spring actuated jaw is in closed position with the animal between the cross bar 16 and base 10. My control member may be connected thereto by placing said base 88 on said base 10 with said retaining pin 90 extending into the opening in the retaining staple 12. Said handle 100 is rotated to turn said lifting finger 98 laterally inward and under said jaw side 14, as shown in said Figure 5. Then said rod 94 is drawn upwardly, and said finger moves upwardly in said slot 40, thus lifting said spring actuated jaw and freeing the dead animal from the trap.

To reset the trap with my control member, the rod 94 is moved farther upwardly until said cross bar 16 is just back of said tooth 70. In doing this part of said rod handle 100 has moved under said spring retainer 92 where it remains indefinitely until released, as shown in dash lines in Figures 5 and 6 of the drawings. Thus the spring actuated jaw is held in open or set position, and the trap may be baited by inserting bait in said bait holder lower end enclosure without fear of the said jaw springing to closed position. To free the control member from the trap the control rod 94 is pushed downwardly away from said retainer 92 and the rod is rotated until said lifting finger is laterally beyond said trap, whereupon the said retaining pin 90 is drawn out of said opening in staple 12. Thus the control member is available to perform the same function for other traps.

What I claim is:

1. An animal trap device comprising a base, a mounting member attached to said base embodying two sides, and a back between said sides having a slot therein extending from the top downwardly, a sring actuated jaw embodying a front cross bar outside of said mounting member, means movably attaching said spring actuated jaw to said base, a supporting catch, extending into said slot, adapted to hold said front cross bar in set position, means movably mounting said supporting catch on and between said sides of said mounting member, means movably connecting said catch to said base rearwardly of said slot, a separate bait holder, and means movably mounting said bait holder on said catch, said bait holder being so positioned that movement in one direction tends to cause it to free said front cross bar from said supporting catch when the latter is in set position.

2. An animal trap device comprising a base, a stall attached to said base embodying two sides and a back, a spring actuated jaw embodying a front cross bar and two sides outside of said stall, means movably attaching said spring actuated jaw to said base, a supporting catch embodying a tooth adapted to hold said front cross bar in set position, a shaft movably mounting said catch on said stall, means embodying a spring member movably connecting said catch to said base, a separate bait holder embodying a forked actuator portion at the upper end thereof adjacent said tooth, said catch extending into the space provided by said forked portion, and a shaft movably mounting said bait holder on said catch at a point forwardly of said forked portion, said actuator portion extending rearwardly of said tooth and adapted upon movement of said bait holder in one direction to contact said front cross bar, when the latter is in set position and exert pressure thereon.

3. An animal trap device comprising a base, a stall attached to said base embodying two sides and a back, a spring actuated jaw embodying a front cross bar and two sides outside of said stall, means movably attaching said spring actuated jaw to said base, a supporting catch embodying a tooth adapted to hold said front cross bar in set position, a horizontal shaft movably mounting said catch on said stall, means embodying a spring member movably connecting a rear portion of said catch to said base, a separate bait holder embodying a forked actuator portion at the upper end thereof adjacent said tooth, a forward portion of said catch extending into the space provided by said forked portion, and a horizontal shaft movably mounting said bait holder on said catch at a point forwardly of said forked portion, said actuator portion extending rearwardly of said tooth and adapted upon movement of said bait holder in one direction to contact said front cross bar when the latter is in set position and exert pressure thereon.

4. An animal trap device comprising a base, a stall attached to said base embodying two sides and a back, a spring actuated jaw embodying a front cross bar and two sides outside of said stall, means movably attaching said spring actuated jaw to said base, a supporting catch extending rearwardly of said back and embodying a tooth adapted to hold said front cross bar in set position, a shaft movably mounting said catch on said stall, means embodying a spring member movably connecting said catch at a point rearwardly of said back to said base, a separate bait holder embodying a receiver portion at the lower end between said stall sides and a forked actuator portion at the upper end thereof adjacent said tooth and above said sides, said catch extending into the space provided by said forked portion, and a shaft movably mounting said bait holder forwardly of said forked portion on said catch, said actuator portion extending rearwardly of said tooth and adapted upon movement of said bait holder in one direction to contact said front cross bar when the latter is in set position and exert pressure thereon, said stall sides extending forwardly beyond said receiver portion thereby to partially conceal the latter at opposite sides thereof.

5. An animal trap device comprising a base, a stall attached to said base embodying two sides and a back having undercut portions at the rear, a spring actuated jaw embodying a front cross bar and two sides outside of said stall, a coil spring in the space provided by said undercut portions operably connected to said jaw, means movably attaching said spring actuated jaw to said base, a supporting catch embodying a tooth adapted to hold said front cross bar in set position, a shaft movably mounting said catch on said stall, means embodying a spring member movably connecting said catch to said base rearwardly of said undercut portions, a separate bait holder embodying a forked actuator portion at the upper end thereof adjacent said tooth, an intermediate portion of said catch extending into the space provided by said forked portion, and a shaft movably mounting said bait holder forwardly of said forked portion on said catch, said actuator portion extending rearwardly of said tooth and adapted upon movement of said bait holder in one direction to contact said front cross bar when the latter is in set position and exert pressure thereon.

References Cited in the file of this patent

UNITED STATES PATENTS

| Number | Name | Date |
|---|---|---|
| 411,247 | Kelley | Sept. 17, 1889 |
| 547,539 | Curley | Oct. 8, 1895 |
| 1,116,127 | Ruby | Nov. 3, 1914 |
| 1,159,100 | Ruby | Nov. 2, 1915 |
| 1,517,210 | Gomber | Nov. 25, 1924 |
| 1,541,855 | Sands | June 16, 1925 |
| 2,254,825 | Middleton | Sept. 2, 1941 |
| 2,343,562 | Love | Mar. 7, 1944 |
| 2,492,957 | Blair | Jan. 3, 1950 |
| 2,494,567 | Lines | Jan. 17, 1950 |